(No Model.)
C. M. EMERSON.
BAND SAW BRAZING CLAMP.
No. 495,881. Patented Apr. 18, 1893.
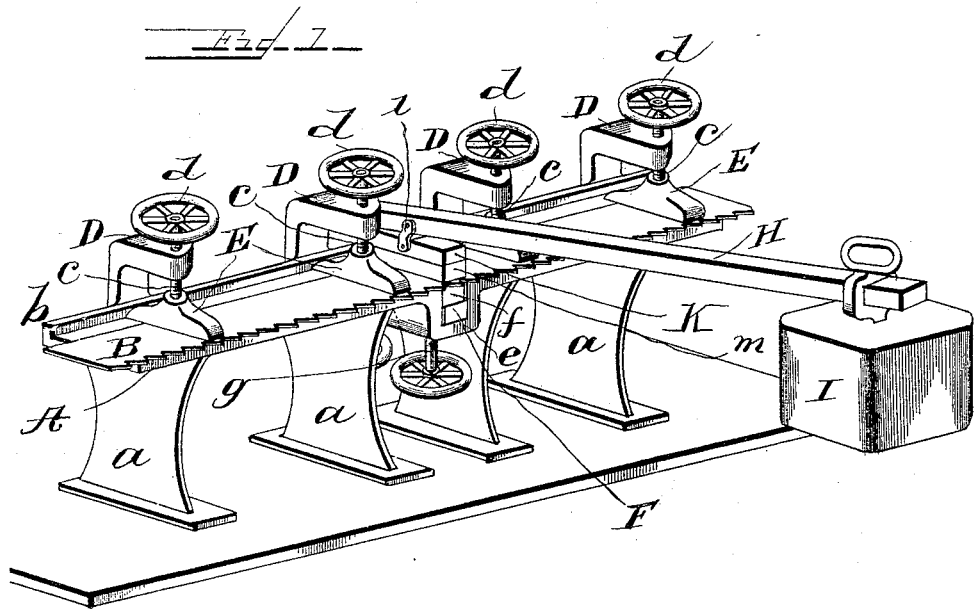
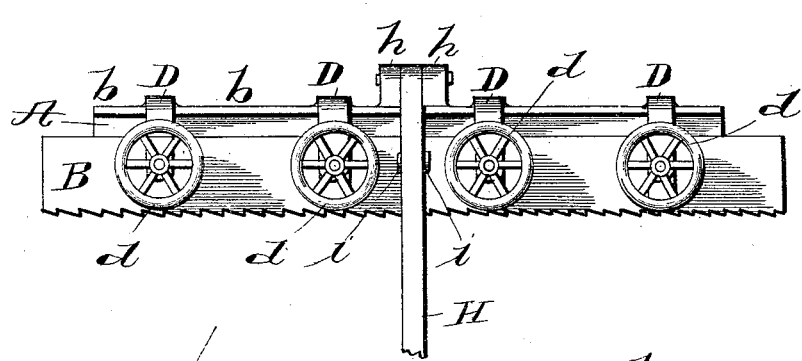
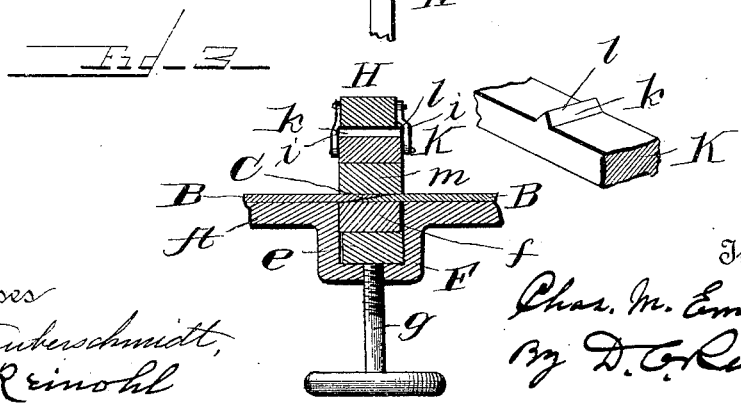
Witnesses
D. A. Tauberschmidt,
H. B. Reinohl
Inventor
Chas. M. Emerson
By D. C. Reinohl
Attorney

UNITED STATES PATENT OFFICE.

CHARLES M. EMERSON, OF EAU CLAIRE, WISCONSIN, ASSIGNOR TO THE PHŒNIX MANUFACTURING COMPANY, OF SAME PLACE.

BAND-SAW-BRAZING CLAMP.

SPECIFICATION forming part of Letters Patent No. 495,881, dated April 18, 1893.

Application filed June 21 1892. Serial No. 437,468. (No model.)

*To all whom it may concern:*

Be it known that I, CHARLES M. EMERSON, a citizen of the United States, residing at Eau Claire, in the county of Eau Claire and State of Wisconsin, have invented certain new and useful Improvements in Band-Saw-Brazing Clamps; and I do hereby declare the following to be a full, clear, and exact description of the invention, such as will enable others skilled in the art to which it appertains to make and use the same.

My present invention relates to the art of brazing band saws and has for its object a method of operation and the construction of a device to effect the brazing or soldering of joints under a continuous and uniform pressure, whereby surplus solder only is displaced from the joint, the parts to be soldered held firmly together, the shrinkage of the soldering-irons (while cooling) taken up or compensated and a joint produced of the same thickness as the remaining portion of the saw. Under the prevailing systems of operation in brazing band saws, the hot irons are pressed upon the joint by means of a hand screw or screws and the parts left to cool; as a consequence of such practice too much pressure is frequently applied and the solder displaced to such an extent as to produce an imperfect joint, or not enough pressure is applied to displace sufficient solder to reduce the thickness of the overlapping parts to form the joint to the same thickness as the remaining portion of the saw, and the shrinkage of the soldering-irons as they cool loosens the clamp from the joint and the two overlapping parts thereof separate, producing a thickened joint which must be subsequently reduced by filing until it is of the same thickness as the remaining portion of the saw.

The invention will be fully disclosed in the following specification and claims.

In the accompanying drawings which form part of this specification, Figure 1 is a perspective of my improved brazing-clamp; Fig. 2 a top plan view, and Fig. 3 a transverse section.

Reference being had to the drawings and the letters thereon, A indicates a table or support upon which a band saw B is laid while its joint C is being brazed or soldered. The table is provided with suitable legs $a$ which may rest upon the top of a bench, table, or the floor of a building, a vertical flange $b$ on the rear edge, forwardly projecting arms D, which support clamp jaws E upon adjustable screws $c$ provided with hand wheels $d$, all of which are of ordinary constructions found in this class of devices.

In the table A is formed a transverse depression or pocket F, in which is a bar of metal $e$ and above which is a soldering-iron $f$, the two being adjustable vertically by means of the screws $g$ $g$ to raise the soldering-iron up against the under side of the saw adjacent to the overlapping portions to form the joint G.

H indicates a lever pivotally secured between lugs $h$ $h$ on the rear edge of the table A, extends forward across the table and is provided with a weight I, adjustable on the lever, and on the under side of said lever is a clamping-bar K, pivotally secured to the lever by straps or links $i$ $i$, so that the bar can swing freely on the lever in any position in which it may be placed; and on the upper surface of the bar K, is a projection $k$ having a fine bearing edge $l$, which admits of the lever H rocking back and forth on the bar and secures an even and regular bearing of said bar on the soldering-iron $m$ all the way across the saw in whatever position the lever H may rest. This projection may be on the under side of the lever H if desired, or in lieu of the knife edged bearing $l$ an eccentric cam may project from the under side of the lever.

The device being constructed substantially as described, the operation is as follows. The ends of a band saw having been properly beveled and solder applied to the contiguous surfaces, the saw is laid upon the table A, the soldering-irons $f$ and $m$ properly heated are applied respectively on each side of the saw, the lower one $f$ being adjusted by the screws $g$ $g$ until it bears against the saw, the lever H, with the clamping-bar K is then brought forward across the table and the bar K placed directly over the soldering-iron $m$, when the weight I is applied to the lever H in such position that it will exert just enough pressure to displace any surplus solder in the joint and automatically take up the shrinkage due to the cooling of the soldering-irons and secure the contiguous surfaces of the joint in contact with each other under a continuous and uniform pressure until the saw has been cooled; thus securing a joint of the same thickness as the remaining portion of the saw, and reducing defective or imperfect joints to the minimum. To insert the saw, or place it upon the table A, the weight I is removed from the lever H, and the latter raised into a vertical position out of the way of the workmen, and returned after the saw has been properly placed on the table and the soldering-iron $m$ applied.

Having thus fully described my invention, what I claim is—

1. The method of soldering joints, which consists in applying heated soldering irons to both sides of a joint, displacing the excess of solder and taking up the shrinkage of the soldering irons by applying continuous and uniform predetermined pressure.

2. In a soldering device, the combination of a table or support for the article to be soldered, suitable means for applying heat to both sides of the joint, a clamping bar separate from the soldering iron, and a device for producing continuous and uniform predetermined pressure.

3. In a soldering device, the combination of a table or support, upper and lower soldering-irons, a weighted lever attached to one edge of the table, and a clamping-bar connected to the lower side of said lever and resting on one of the soldering irons.

4. In a soldering device, the combination of a table or support, a pair of soldering-irons, a weighted lever and a clamping-bar pivotally secured to said lever and resting on one of the soldering irons.

5. In a soldering device, the combination of a table or support, a soldering-iron, a clamping-bar resting upon said iron, a weighted lever to which the bar is pivotally connected and a bearing surface between the bar and the lever.

6. In a soldering device, the combination of a table or support, a soldering iron, a lever crossing the table and provided with a clamping-bar, which rests on the soldering iron and a weight adjustable on said lever.

In testimony whereof I affix my signature in presence of two witnesses.

CHARLES M. EMERSON.

Witnesses:
WM. BUSSELMAN,
C. B. DANIELS.